United States Patent [19]

McClure

[11] Patent Number: 4,493,139

[45] Date of Patent: Jan. 15, 1985

[54] BOILER PIPE ASSEMBLY TOOL

[76] Inventor: Gary W. McClure, Rte. 7, Box 228-A, South Charleston, W. Va. 25309

[21] Appl. No.: 400,134

[22] Filed: Jul. 20, 1982

[51] Int. Cl.³ .............................................. B23P 19/04
[52] U.S. Cl. ...................................... 29/267; 29/237
[58] Field of Search ................. 29/237, 267, 238, 244; 254/254–256, 29 R, 30, 31

[56] References Cited

U.S. PATENT DOCUMENTS

| 333,577 | 1/1886 | Watson | 254/31 |
|---|---|---|---|
| 1,140,115 | 5/1915 | Carson | 254/255 |
| 1,518,769 | 12/1964 | Brunk | 254/255 |
| 2,681,028 | 6/1954 | Phillips | 228/50 |
| 2,793,424 | 5/1957 | Witte | 29/237 |
| 2,940,267 | 6/1960 | Shaver | 254/29 R |

Primary Examiner—James L. Jones, Jr.
Attorney, Agent, or Firm—Harvey B. Jacobson

[57] ABSTRACT

A boiler pipe assembly tool that has separate one-piece gripping jaws engaged with the pipe sections or tubes to be connected, an operating lever and short flexible chains connecting the lever and jaws to move adjacent ends of the tube sections into aligned relation and into engagement with an interposed chill ring used to provide resistance necessary to allow the tool to function in the alignment of and welding of the tube sections. The separate gripping jaws include a structure enabling the point of connection of the chains to be adjusted thereby varying the force moment arm on each jaw.

9 Claims, 4 Drawing Figures

BOILER PIPE ASSEMBLY TOOL

BACKGROUND OF THE INVENTION

1. Field of the Invention

The present invention relates to a tool or device for pulling boiler pipe or tube sections into adjacent coaxial relation with a chill ring therebetween so that the adjacent ends of the boiler pipe or tube sections can be welded together.

2. Description of the Prior Art

Various tools and prior art arrangements are exemplary as shown by the U.S. patents as follows: U.S. Pat. Nos. 870,931, A. Claiborne; 2,793,424, G. E. Witte; 3,668,766, J. W. Carter et al.

The patent to Claiborne discloses a structure for pulling pipe sections together in the form of a pivotal handle with rods or links connected to jaw structures which grip the sections of pipes to be moved. The Witte patent discloses a similar structure in which the pipe gripping jaws are pivotal components with the handle being connected to the jaws through flexible chains. The Carter et al. patent discloses another similar tool in which the pipe jaws are modified "Vise-Grips". None of these patents disclose the specific details of the invention in such a way as to bear upon the patentability of the claims of the present invention.

SUMMARY OF THE INVENTION

An object and advantage of the invention is to provide an improved boiler pipe tool for joining adjacent ends of boiler tubes by welding after the tubes are pulled towards each other and positioned in alignment by the tool.

Another object and advantage of the invention is to provide a tool according to the preceding object for adjustably tensioning the aligned pipes and pulling them into engagement with a chill ring so that the pipe ends can be secured together by welding while in the tensioned position.

A further object of the invention is to provide a tool which is designed to grip adjoining ends of a pair of pipe sections and to draw one section axially toward the other section so as to force the ends into axial proximity for welding the ends together. The tool provides for assembly of pipe sections by use of curved jaws engageable against opposite sides of a pipe section, said curved jaws having arms to which flexible chains are connected, the jaws being tilted by an operating lever interconnecting the chains to cause the jaws to firmly contact the periphery of the pipe sections to effect a positive gripping action.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
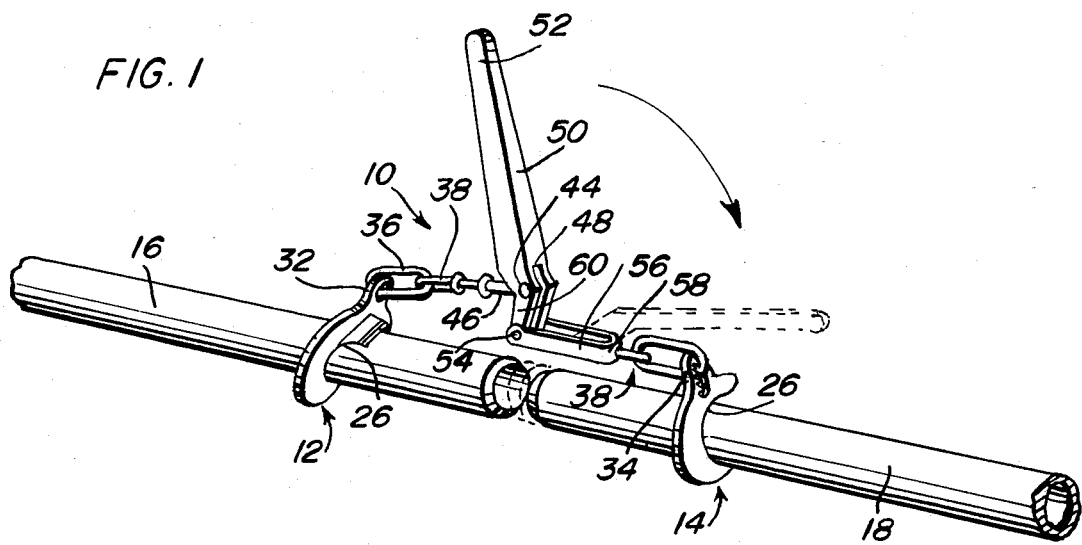
FIG. 1 is a perspective view of the boiler pipe tool of the present invention.

Referring now to the drawings there is shown a boiler pipe tool 10 having a set of clamping C-shaped members or jaws 12, 14 secured onto respective boiler pipe or tube sections 16, 18 of generally hollow cylindrical configuration.

Each of the jaws 12, 14 are generally similar in construction and includes a pair of spaced members 20, 22 extending respectively outwardly from a connecting member 21 to form a laterally opening space 23 to receive the respective tube sections 16, 18.

Each member 20, 22 has tube section contacting portions 24, 26 for engaging the pipe sections 16, 18, and portion 26 has transversely oriented rocker elements 28, 30 having a generally convex surface with gear teeth 31 provided for purposes of enabling secure engagement with the cylindrical surface of the pipe sections 16, 18. The rocker elements serve to prevent slippage by effectively biting into the peripheral surfaces of the pipe sections.

Figure 2:
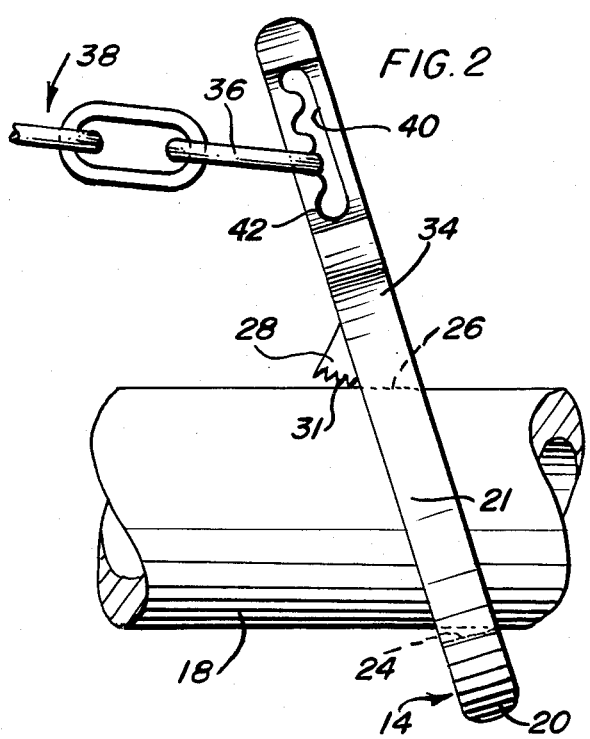
FIG. 2 is an enlarged front elevational view of one jaw of the tool affixed onto a pipe section.
Figure 3:
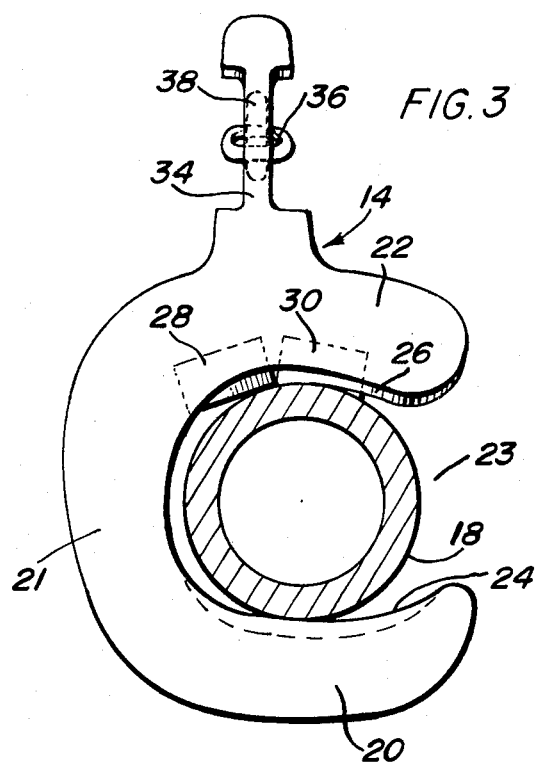
FIG. 3 is a left side elevational view of the arrangement shown in FIG. 2.

The C-shaped members or jaws 12, 14 include an arm or extension member 32, 34 extended outwardly of the jaws 12, 14. The members 32, 34 are elongated in configuration and have a width dimension capable of being received within a link 36 of a chain 38. The link 36 has an end that is received and passes through an elongated aperture 40 shown in FIG. 2 which has a series of recesses 42 substantially evenly distributed along a lateral portion of the elongated aperture 40. Positioning the chain in one of the recesses 42 allows for adjustment of the magnitude of the moment arm of any force applied to the pipe sections 16, 18 in drawing them together along axes of the pipe sections.

While the end link 36 of each of the chains 38 is connected to the jaws 12, 14, the other end of one of the chains 38 is connected to an eyebolt 46 or other connector which is pivotally connected to an intermediate portion of a lever 50 by pivot pin 44. The lever 50 is constructed of metal of conventional manufacture and its free end terminates in a handle 52 and the other end of the lever 50 is bifurcated at 48 to receive pivot pin 44 and a pivot pin 54 connecting a U-shaped clevis 56 having a bite portion 58 connected with the other chain 38. The lever 50 includes an offset portion 60 where pivot pin 44 is located so that the pivot axis defined by pin 44 can move between the legs of clevis 56 to form an overcenter lock for the lever 56 when the jaws 12, 14 are moved toward each other. The structure and operation of the lever 50 and chains 38 is similar to that used in load binders, log chain tighteners, wire fence stretchers and the like.

Variations in forces applied to bring the pipe sections 16, 18 together will be affected by the positions of the jaws 12, 14 on the pipe sections 16, 18 by the positions of the links 36 in a selected recess 42 and the dimensions of the components.

Figure 4:
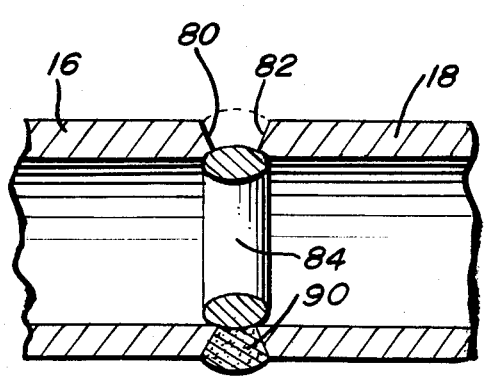
FIG. 4 is a sectional view of the pipe sections, the weldment and the chill ring.

As is well known a chill ring 84 is positioned between mating ends 80, 82 of the pipe sections. The chill ring serves to maintain alignment of mating ends of the pipe sections while the pipe sections 16, 18 are welded together such as by a weld 90 shown in part in FIG. 4. The chill ring provides resistance and permits the tool to align the tubes or pipe sections with each other.

Boiler tubes are brought together by means of use of the tool of the present invention and the tool 10 requires less than the usual forces required to draw the pipe sections together into alignment with one another. The angulated offset provided at 60 allows the lever 50 to extend through a greater arc to move the lever overcenter as shown in FIG. 1, yet automatically aligns the tubes or pipe sections 16, 18 and works particularly effectively with tubes having a chill ring 84 as above described. The surfaces provided by means of the rocker elements 28, 30 improve the capability of the self-gripping of the jaws 12, 14 on the pipe sections 16, 18 when tilted inwardly. The recesses 42 provide for adjusting the length of the moment arm for better control in alignment of the pipe sections in adjacent relation and the tool will retain this relation until released.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. Boiler pipe tool comprising a pair of rigid C-shaped jaws for engaging pipe sections at opposed circumferential portions thereof, a flexible means connected to each C-shaped jaw at a location adjacent one end of the jaw and a lever having a handle portion at one end, the other end of the lever being connected to the respective flexible means at spaced points to move the jaws toward each other in response to swinging the lever, said lever having an offset portion at the end to which the flexible means are attached for providing overcenter movement of the points of attachment when the lever is pivoted to a position to force the ends of the pipe sections together and locking the tool in position to enable welding without holding the lever of the tool.

2. The invention of claim 1 wherein a fixed rocker element having an arcuate surface is attached to each of the C-shaped jaws for gripping engagement with the pipe sections.

3. The invention of claim 1 wherein each of the C-shaped jaws includes means enabling connection of the flexible means to the jaws at adjusted positions relative to the pipe sections to effect a difference in the moment arm of the forces applied by the jaws.

4. The invention of claim 1 wherein the lever is pivotally coupled at one end to a U-shaped clevis forming a portion of one of said flexible means and pivotally coupled to an eyebolt in spaced relation to the clevis, the eyebolt forming a portion of the other of said flexible means.

5. The invention of claim 1 wherein each of said jaws is of one-piece construction having a lateral opening receiving the pipe sections with the opposed surfaces defining the opening being spaced apart a distance greater than the diameter of the pipe sections to enable easy assembly and disassembly of the jaws onto the pipe sections when in perpendicular relation thereto, said opposed surfaces on the jaws having edge portions which frictionally engage the circumferential opposed portions of the pipe sections when tilted and forced longitudinally of the pipe sections, said flexible means comprising a chain segment, means on at least one jaw to enable adjustable attachment of the chain segment to adjust the distance from the jaw opening to the point of force application from the chain segment to the jaw.

6. A pipe tool comprising a pair of C-shaped members for grasping pipe sections to be joined together at adjacent ends, the grasping by said members being spaced from said adjacent ends, projections extending from the C-shaped members adjacent the respective ends of the C-shaped members, the projections being oriented in a generally common direction with each other, and coupling means connected to each of the projections and having distal ends of the coupling means connected to spaced points of an angulated portion of a lever arm, wherein one of the coupling means has an adjustable connection with its respective projection comprising an elongate slot in the projection and means for locating the coupling means at selected positions along the length of the slot.

7. The invention of claim 6 wherein an angulated portion of the lever arm and including said spaced portion bounded by the connection to each of the coupling means, is, upon being turned about a moment arm of the tool, thereupon received within a U-shaped member to extend the length of the turning moment arm.

8. In combination with a pair of boiler pipe sections having mating ends to be welded together, a chill ring having an external diameter less than the external diameter of the pipe sections and being positioned between the ends for maintaining alignment between the pipe sections while the mating ends are welded together with the chill ring and the ends of the pipe sections defining a peripheral channel to receive welding material which joins the pipe sections and chill ring, and a pipe tool for drawing the ends of the pipe sections together into alignment against the chill ring, the pipe tool comprising a pair of jaws engaging the respective pipe sections, flexible means connected to the respective jaws, and a hand lever to which the flexible means are connected at spaced points on the lever for providing a pulling force closing the pipe ends on the chill ring when the lever is urged in one direction longitudinally of the pipe sections, wherein each jaw comprises a rigid C-shaped jaw with the flexible means attached adjacent one end thereof and wherein said lever has an offset portion at one end to which the flexible means are attached for providing overcenter movement of the points of attachment when the lever is urged in said one direction so as to lock the tool in position and enable welding without holding the lever.

9. The invention of claim 8 wherein each jaw has a projection to which the respective flexible means is attached, and wherein one of the flexible means has an adjustable connection with its respective projection comprising an elongate slot in the projection and means for locating the flexible means at selected positions along the length of the slot.

* * * * *